United States Patent
Bhatia et al.

(10) Patent No.: US 10,592,417 B2
(45) Date of Patent: Mar. 17, 2020

(54) VIDEO REDIRECTION IN VIRTUAL DESKTOP ENVIRONMENTS

(71) Applicant: VMware, Inc., Palo Alto, CA (US)

(72) Inventors: Lavesh Bhatia, Palo Alto, CA (US); Shixi Qiu, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 202 days.

(21) Appl. No.: 15/655,344

(22) Filed: Jul. 20, 2017

(65) Prior Publication Data
US 2018/0349283 A1  Dec. 6, 2018

Related U.S. Application Data

(60) Provisional application No. 62/514,814, filed on Jun. 3, 2017.

(51) Int. Cl.
| | |
|---|---|
| *G06F 9/46* | (2006.01) |
| *G06F 12/0868* | (2016.01) |
| *G06F 9/455* | (2018.01) |
| *H04N 21/443* | (2011.01) |
| *G06F 9/451* | (2018.01) |

(Continued)

(52) U.S. Cl.
CPC .......... *G06F 12/0868* (2013.01); *G06F 9/452* (2018.02); *G06F 9/45529* (2013.01); *G06F 9/45558* (2013.01); *G06F 16/9574* (2019.01); *H04N 21/431* (2013.01); *H04N 21/4316* (2013.01); *H04N 21/4437* (2013.01); *H04N 21/4782* (2013.01); *H04N 21/8543* (2013.01); *G06F 2009/45579* (2013.01); *G06F 2009/45583* (2013.01)

(58) Field of Classification Search
CPC ........... G06F 12/0868; G06F 9/45558; H04N 21/431; H04N 21/4316; H04N 21/4437; H04N 21/4782; H04N 21/8543
See application file for complete search history.

(56) References Cited

U.S. PATENT DOCUMENTS

| | | |
|---|---|---|
| 7,509,267 B1 | 3/2009 | Yarmolich et al. |
| 9,235,850 B1 * | 1/2016 | Erat .................... G06Q 30/0256 |

(Continued)

OTHER PUBLICATIONS

"Chromium Embedded Framework Project Page"; https://bitbucket.org/chromiumembedded/cef; 2 pages; captured on Jun. 5, 2017.

(Continued)

*Primary Examiner* — Camquy Truong (57) ABSTRACT

A system is described for playing embedded video on the Web inside the virtual desktop. A video element, such as an HTML5 video element, in a webpage accessed through a browser in the virtual desktop can be detected and video content for the video element can be intercepted before it is decoded in the virtual desktop. The encoded video data can be transmitted to the client device. On the client device, a counterpart video rendering application can receive the transmitted video data, decode it, and render it in a window that is overlaid onto a corresponding area of the virtual desktop graphical user interface (GUI) in a client application. Headless video composition can be implemented for rendering the video on the client, giving the illusion of the video playing inside the virtual desktop, while it is actually playing on the client itself.

17 Claims, 5 Drawing Sheets

(51) Int. Cl.
*H04N 21/4782* (2011.01)
*H04N 21/431* (2011.01)
*H04N 21/8543* (2011.01)
*G06F 16/957* (2019.01)

(56) References Cited

U.S. PATENT DOCUMENTS

| | | | |
|---|---|---|---|
| 9,372,737 | B2 | 6/2016 | Kruglikov et al. |
| 2004/0041820 | A1* | 3/2004 | Sevigny .................. G06T 1/00 345/619 |
| 2006/0282855 | A1 | 12/2006 | Margulis |
| 2009/0303156 | A1 | 12/2009 | Ghosh et al. |
| 2010/0077058 | A1 | 3/2010 | Messer |
| 2010/0271381 | A1 | 10/2010 | Byford et al. |
| 2011/0264751 | A1* | 10/2011 | Jans .................. G06Q 10/107 709/206 |
| 2013/0204927 | A1 | 8/2013 | Kruglikov et al. |
| 2014/0320587 | A1* | 10/2014 | Oynnan ................ H04W 4/70 348/14.07 |
| 2015/0113157 | A1* | 4/2015 | Chan ..................... H04L 65/60 709/231 |
| 2016/0277470 | A1 | 9/2016 | Kruglikov et al. |

OTHER PUBLICATIONS

Google Chrome; "What are extensions?"; https://developer.chrome.com/extensions; 2 pages; captured on Jun. 5, 2017.

W3C Wiki; "HTML/Elements/video"; https://www.w3.org/wiki/HTML/Elements/video; 6 pages; captured on Jun. 5, 2017.

W3C Specification; "Media Source Extensions"; https://www.w3.org/TR/media-source; 87 pages; captured on Jun. 5, 2017.

Google Chrome; "Native Messaging"; https://developer.chrome.com/extensions/nativeMessaging; 7 pages; captured on Jun. 5, 2017.

RFC 6455; "The Websocket Protocol"; https://tools.ietf.org/html/rfc6455; 72 pages; captured on Jun. 5, 2017.

Citrix, "Troubleshooting the HDX Media Stream (SpeedScreen Multimedia Acceleration) Feature", 5 pages, Jul. 21, 2010, available at http://support.citrix.com/article/CTX104912?print.

Microsoft, "Remote Desktop Protocol", 3 pages, 2011, available at http://msdn.microsoft.com/en-us/library/windows/dekstop/aa383015.

Teradici, "APEX 2800 PCoIP Server Offload Card", 2 pages, 2012, available at http://www.teradici.com/pcoip/pcoip-products/pcoip-server-offload.

* cited by examiner

VIDEO REDIRECTION IN VIRTUAL DESKTOP ENVIRONMENTS

CLAIM OF PRIORITY

This Application claims benefit of U.S. Provisional Application No. 62/514,814, filed Jun. 3, 2017, entitled "HTML5 Video Redirection in a Virtual Desktop Environment using a Web Browser Extension", and listing as inventors Lavesh Bhatia and Shixi Qiu, the disclosure of which is incorporated by reference herein in its entirety.

TECHNICAL FIELD

The present disclosure generally relates to virtual desktop infrastructure and more specifically to techniques for efficient handling of embedded videos in internet browsers running on virtual desktops.

BACKGROUND

Virtual desktops provided as part of a virtual desktop infrastructure (VDI) or desktop-as-a-service (DAAS) offerings are becoming more commonplace in today's enterprise work environments. The security of having a remotely stored desktop, ability to access the desktop from any location and on any device, centralized desktop management, efficient use of hardware resources, as well as numerous other benefits made possible by VDI/DAAS are a large benefit for many organizations.

In a conventional VDI or DAAS environment, each user in an enterprise is provisioned a virtual desktop and is allowed to access his or her virtual desktop over a remote network connection, such as a WAN connection. The virtual desktops are typically hosted on servers that reside in a data center of the enterprise (or a third-party service provider), and each host server may execute multiple virtual desktops. Users can utilize a client device to remotely log into their individual virtual desktop and all of the application execution takes place on the remote host server which is linked to the local client device over a network using a remote display protocol, such as remote desktop protocol (RDP), PC-over-IP protocol (PCoIP), VMware Blast, virtual network computing (VNC) protocol, or the like. Using the remote desktop protocol, the user can interact with applications of the virtual desktop, which are running on the remote host server, with only the display, keyboard, and mouse information communicated with the local client device. A common implementation of this approach is to host multiple desktop operating system instances on separate virtual machines deployed on a server hardware platform running a hypervisor.

While desktop virtualization offers numerous advantages, providing users of virtual desktops with an experience that is equivalent to using a locally executing desktop poses numerous challenges. For example, when a user plays a video on the Web inside the virtual desktop, such as an HTML5 video embedded in a webpage, the video playback may be of poor quality, it may lack audio/video synchronization, and suffer a low frame rate. The interrupted playback performance is due to the rendering of the video in the virtual desktop and the remoting protocol capturing the screen images at a very high rate and sending them to the client device, causing heavy use of processing power and network bandwidth. More specifically, every time the screen buffer on the virtual desktop changes, the changed pixel data is transported to the client device. In the case of a high refresh rate video, this entails rapid transfer of significant volumes of data, consuming substantial CPU and network bandwidth resources. Oftentimes, the result is poor image quality, lack of audio/video synchronization, interrupted playback, and low framerate.

A more efficient approach is desirable for playing embedded video on the Web inside the virtual desktop.

DETAILED DESCRIPTION

Systems and methods in accordance with various embodiments of the present disclosure overcome at least some of the above-mentioned shortcomings and deficiencies by providing more efficient ways to play embedded video on the Web inside a virtual desktop that is accessed by a client application on a client device. More particularly, embodiments described herein introduce a system that can detect a video element, such as an HTML5 video element, in a webpage that is opened in a browser in the virtual desktop. Once the video element is detected, the system can intercept video data transmitted to the video element from the web server providing the video content, before the video data is decoded on the virtual desktop. In the virtual desktop, the video can be muted and blocked out so that it is not displayed in the graphical user interface (GUI), such as by overlaying the video element with a dummy object (e.g. a solid color HTML element). Once the video element is blocked out, the remoting protocol may no longer attempt to transport the changed pixel data in the video to the client, thereby avoiding the consumption of resources (such as CPU and bandwidth) that occurs in traditional systems, as described previously. The intercepted and still encoded video data can be transmitted to the client device over a separate channel, such as a protocol virtual channel.

On the client device, a counterpart video rendering application can receive the transmitted video data, decode it, and render it in a window that is overlaid onto a corresponding area of the client GUI (i.e., over the location of the video element). The video rendering application can draw the video only over regions where the dummy object is visible, in order to avoid drawing the video over objects, such as windows, that may be overlapping the video element in the virtual desktop GUI. Further, headless video composition can be implemented for rendering the video on the client, giving the illusion of the video playing inside the virtual desktop, while it is actually playing on the client itself.

To allow a user to interact with the video, video commands (such as play, pause, seek, volume change, etc.) can be detected at the virtual desktop and transmitted to the video rendering application on the client device to be applied. Namely, because user inputs in the client application, such as mouse and keyboard inputs, are transmitted to and applied in the virtual desktop, when a user makes a video command such as pressing the pause/play button or seeking a video, the command is detected at the virtual machine. The video, however, is playing on the client device, in the video rendering application. Hence, to put the video command into effect, the virtual desktop can transfer the detected video command to the video rendering application on the client, which can effectuate the command. As a result, the user can experience the same level of control over the video as in a traditional setting where the video is played in the virtual desktop.

Instead of the traditional approach to viewing embedded video in virtual desktops, where a browser on the virtual machine (VM) decodes the video, displays it on the VM, and the remoting protocol picks up and sends the pixel data to the client, embodiments described herein intercept the raw and still encoded video data, transmit it to the client, and decode and play it in a video rendering application on the client interposed over the area of the GUI where the video is intended to be displayed. As a result, resource consumption caused by the remoting protocol having to rapidly transmit large volumes of changed pixel data can be reduced, while users enjoy the superior user experience provided by rendering the embedded video locally on the client device.

Figure 1:
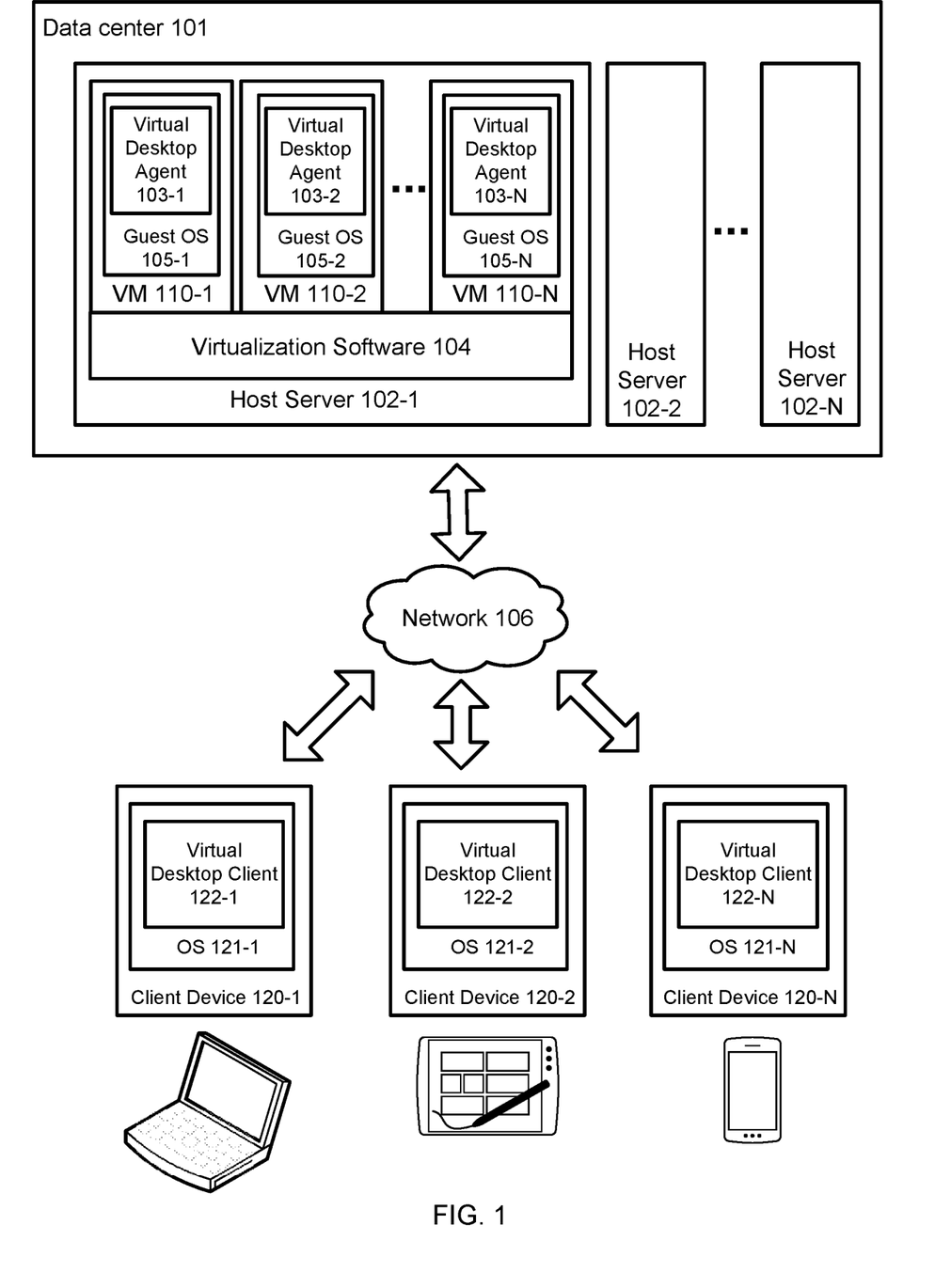
FIG. 1 illustrates an example of a virtual desktop environment, in accordance with various embodiments.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent. Interactions between the virtual desktop client (e.g., 122-1, 122-2, 122-N) and the virtual desktop agent (e.g., 103-1, 103-2, 103-N), including transmission of encoded visual display information from the agent to the client and user input events from the client to the agent can be performed using a remote desktop protocol, such as Remote Desktop Protocol (RDP), PC-over-IP protocol (PCoIP), VMware Blast, virtual network computing (VNC) protocol, or the like.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
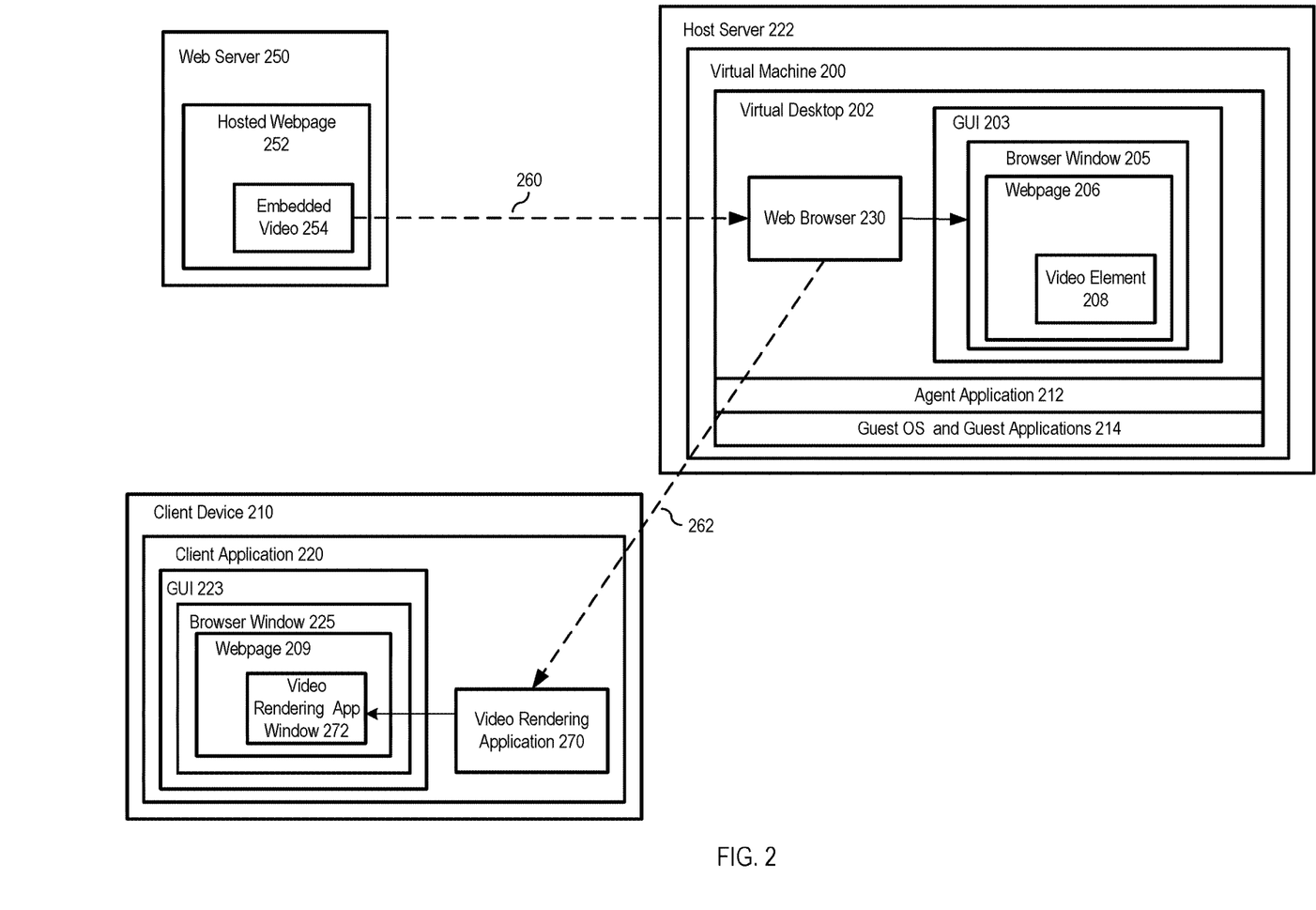
FIG. 2 illustrates an example diagram of a system for video redirection in a virtual desktop environment, in accordance with various embodiments.

FIG. 2 illustrates an example diagram of a system for video redirection in a virtual desktop environment, in accordance with various embodiments. As illustrated, a client device 210 can be communicatively linked, e.g., over a network such as the Internet, to a virtual machine 200 residing on a host server 222, which may reside inside an on-premises datacenter or a datacenter of a third-party service provider. A guest operating system (OS) and guest applications 214 may be executing in the VM 200 to produce a virtual desktop 202. A user of the client device 210 can interact with the virtual desktop 202 via a client application 220 (such as the VMware Horizon Client Application, available from VMware, Inc.), which may be a native client application, running on the client device 210 that communicates with an agent application 212 in the virtual machine 200. User inputs, such as keyboard and mouse inputs, produced in the client application 220 can be transmitted by the client application 220 to the agent 212 based on a remoting protocol, and the agent can inject the inputs into the virtual desktop 202 to effectuate them. Outputs of the virtual desktop 202, such as the GUI 203 of the virtual desktop 202, can be transmitted by the agent 212 to the client device 210 based on the remoting protocol and displayed in the client application 220 as a GUI 223. In this way, a user of the client device 210 may be able to interact with the virtual desktop 202 as if it was executing locally on the client device 210 while execution actually takes place in the remote VM 200.

In various embodiments, the virtual desktop 202 may execute a web browser 230, such as a Google Chrome Internet browser, available from Google, Inc. or another Internet browser. For example, a user of the client device 210 may launch the web browser 230 inside the virtual desktop 202 via the client application 220. The browser 230 can produce a corresponding browser window 205 in the virtual desktop GUI 203. Accordingly, as the GUI 203 of the virtual desktop 202 is streamed to the client 220, the virtual desktop browser window 205 is also transmitted and is displayed in the GUI 223 as browser window 225.

As illustrated in the example of FIG. 2, a web server 250 can host a webpage 252 that includes an embedded video 254 such as, for example, an HTML5 video. Communication between the host server 222 and the web server 250 can take place over a network, such as the Internet. The browser 230 can request the hosted webpage 252 from the web server 250. In response to the request, the web server 250 can transmit the webpage 252 to the browser 230, and a corresponding webpage 206 can be rendered in the browser window 205 in the virtual desktop 202. The rendered webpage 206 can contain a video element 208, which is intended to display the embedded video 254. As the remoting protocol transmits the GUI 203 of the virtual desktop 202 to the client 220, the webpage 206 is also transmitted and displayed in the client GUI 223 as webpage 209.

In various embodiments, the system can detect when an embedded video (e.g., 254) or a video element 208 is present in a webpage (e.g., 206). When the embedded video 254 or a video element 208 is detected, a process can be initiated to intercept any embedded video data 260 that the web server 250 may transmit to the virtual desktop 202 for displaying a video in the video element 208. As illustrated in the example of FIG. 2, the web server 250 can transmit encoded data of the embedded video 254 to the browser on the virtual desktop 202 (shown by arrow 260) and the transmitted encoded video data 260 can be intercepted before it is decoded and redirected to a video rendering application 270 in the client 220 (shown by arrow 262). In various embodiments, the video data transfer 262 can occur over a separate connection or channel established between the virtual desktop 202 (e.g., via the agent 212) and the client 220. For example, a separate channel (such as a TCP channel) can be opened and the video data 262 can be transferred without involving the agent 212. In other embodiments, the video data 262 can be conveyed to the agent 212, and the agent 212 can handle the data transfer 262. Various desktop remoting protocols provide for the establishment of separate virtual communication channels between the client 220 and the agent 212. In various embodiments, the intercepted video data 262 can be transmitted over such a protocol virtual channel.

As will be described in more detail below, the video rendering application 270 can decode the encoded video data 262, render, and display the video in a video rendering application window 272 that is overlaid over the client GUI 223 in a way such that the video is displayed in the GUI 223 in the same way as it would appear if viewed in the virtual desktop 202 directly (i.e., in the correct location, with the correct size, etc.). For example, the video can be rendered in the window 272, and the window can be overlaid over the area of the GUI 223 where the video was intended to be played in the webpage 206 (e.g., over the location of the video element 208). Further, the video rendering application 270 can be configured to display the video so that it appears in the client GUI 223 in the same way as it would appear in the virtual desktop GUI 203. For example, if the video element 208 is blocked or covered (fully or partially) by another object in the GUI 203, then the video rendering application 270 can show the same portions of the video in the rendering window 272 as would be visible in the virtual desktop GUI 203 and not the blocked portions. For example, if a portion of the video element 208 in the virtual desktop GUI 203 is blocked by another object, then the video rendering application 270 can leave the portion of the window 272 corresponding to the blocked portion of the video element 208 empty or transparent, and only draw the video in the remaining portions of the window 272, corresponding to the portions of the video element 208 that are not blocked.

The video rendering application 270 can be any module capable of rendering (e.g., decoding, displaying, etc.) a video in a defined area, in a defined location, such that the rendered video can be played in a window 272 that is overlaid on the webpage 209. For example, the video rendering application 270 can be an HTML5 compliant browser engine. The rendering application 270 can be a browser rendering engine based on the Chromium Embedded Framework. Further, the video can be presented in the window 272 to look identical to how it would look if viewed in the virtual desktop 202 directly instead of being overlaid over the client GUI 223. For example, headless video composition can be implemented for rendering the video on the client, (e.g., such that only the video images are presented) giving the illusion of the video playing inside the virtual desktop 202, while it is actually playing on the client 210 itself.

In various embodiments, interception of the encoded video stream 260 may be performed by the browser 230, which may be specifically configured to perform the corresponding functions. In various embodiments, a standard Internet browser, such as Google Chrome by Google, Inc., can be modified with a browser extension to perform these functions. Such a browser extension can operate by injecting a content script into the context of the webpage. For example, when a user accesses a webpage, the browser extension can inject the content script into the webpage while it is being loaded. This can allow access to the entire context of the webpage code. Thus, running in the context of the webpage, a scan can be performed in an area to determine if any video elements (e.g., 208) are present. For example, every time the browser (e.g., Chrome) starts, a manifest file in the browser extension can instruct the browser whenever a webpage loads, to inject the content script into the webpage, so that the context of the webpage can be accessed. Particularly with technology such as HTML5, which is a plugin-less technology, it may be necessary to get into the HTML code of the webpage to detect embedded videos. In various embodiments, the content script can be a JavaScript that is loaded into the webpage HTML, gets executed by the browser, and runs in the context of the webpage.

Hence, as described above, video elements (e.g., 208) in a webpage can be identified. Consequently, when video content 260 for the identified video element 208 is received (e.g., after the browser 230 requests the content) the content can be intercepted and redirected to the video rendering application 270 before it is decoded. Also, when video elements (e.g., 208) in a webpage are identified, the location of the element in the webpage 206, as well as its size (e.g., height and width), etc. can be determined. As will be discussed in further detail below, the location and size information can be used to place a dummy element over the video element 208 in the virtual desktop GUI 203.

In various embodiments, the operations of video element detection and/or interception of video data can happen on a continuous basis. This way, when there is a change in the context of the webpage 206, the system can react accordingly. For example, if the location or size of the video element 208 changes (e.g., if the browser 205 is scrolled, the video window is enlarged, the video window goes full screen, etc.) the interception mechanism can detect the change and send notifications of changes to video element position and/or size to other parts of the system (e.g., to change the location and/or size of the dummy object and/or of the video rendering application window 272).

While the encoded video data 260 is being redirected to the client 220, the system can prevent the video from being displayed in the virtual desktop GUI 203 (e.g., in the video element 208). Namely, if the video is displayed in the virtual desktop 202, resources (e.g., CPU and bandwidth) may be consumed as the remoting protocol attempts to transfer the changed pixel data from the virtual desktop GUI 203 to the client 220. To prevent this, the system can be configured so that the video is not displayed in the virtual desktop GUI 203, i.e., so that the remoting protocol does not see the video playing and attempt to transport it to the client 220. This can be achieved, for example, by allowing the video to play in the video element 208 and blocking out or covering the video element 208 (e.g., with a solid color). For example, the video element 208 can be covered (e.g., via a process taking place in the browser 230) with a fake or dummy object that does not require consumption of significant resources to be transferred to the client 220, as does a video. The dummy object may be an element, such as an HTML5 element, which may be a solid color (i.e., completely filled in with the color from edge to edge) object of the same shape as the video element 208 that is placed over the video element 208 by the browser 230 to block it. In this way, when the remoting protocol transmits the GUI 203 of the virtual desktop 202 to the client 220, all elements of the webpage 206 can be conveyed as normal except the video element 208, which is prevented from displaying in the virtual desktop GUI 203. In place of the video element 208, for example, another object can be transmitted in the location of the video element 208, such as a dummy object. In other embodiments, different methods of blocking out the video may be used, which may for example involve not allowing the video to play in the video element 208.

Thus, in various embodiments, the video is rendered and plays in the virtual desktop 202 while a dummy object is placed over the video element 208 to block out the video images. In these cases, the system can also mute the audio of the video in the virtual desktop 202. For example, the browser 230 (or a browser extension installed in the browser 230) can mute the volume of the video in the virtual desktop 202. Then, the video's audio can play from the video rendering application 270 in the client itself 220 when the video is rendered, instead of having the audio transported from the virtual desktop 202 by the remoting protocol, which can result in audio/video synchronization problems.

In various embodiments, a process (e.g., a server process such as an independently running process inside the virtual desktop 202 operating system) can create the dummy object by, for example, drawing an element with a certain color key over the video element 208. For example, when a video element (e.g., 208) is identified, the process can generate a random color key and draw a solid color key element (i.e., the dummy object), such as an HTML element, overlaying the video element 208. That is, the dummy object can be positioned perfectly over the video element 208 to block it and no other portion of the GUI 203, such that a solid shape filled with the color key appears over the location where the video element 208 would be. For example, if the video element is a rectangle of a certain height and width, then the dummy object can be an HTML element that is a solid color key rectangle of the same height and width, positioned over the video element 208. The server can determine where to place the dummy object, and its size, based on the location and size of the video element 208. The location and size of the video element 208 can be obtained from the webpage 206 by the browser 230, for example, as described above by using a content script that locates video elements in the webpage 206, which is injected into the browser 230 using a browser extension.

For determining the position of the window 272 and how to render and display the video in it, the video rendering application 270 can be provided with the location and size of the video element 208 (e.g., which may be obtained previously from the webpage 206 by the browser 230). However, in some cases the location and size of the video element 208 may not be sufficient to properly display the video. For example, if there is an object (such as a window) that is placed fully or partially covering the video element 208 (and hence, covering the dummy object overlaying the video element 208) in the GUI 203 of the virtual desktop 202, then the video rendering application 270 should display only those portions of the video (and in their proper location) as would be visible in the virtual desktop 202, in order to create an accurate depiction of the overlapping objects in the GUI 203. To achieve this, the video rendering application 270 can use the color key. Namely, because the color key is drawn over the video element 208, if an object like a window blocks the video element, then only the unblocked parts of the color key (designating the locations in which the video should remain visible) will be transferred to the client GUI 223. Then, when rendering the video in the client 220, the video rendering application 270 can observe the GUI 223, identify the portion of the GUI 223 that is covered with the color key, and only display corresponding portions of the video in those regions, leaving the areas without the color key empty. For example, if the application 270 determines that the color key is present over only a portion of the area where the video element 208 should be (e.g., the right half), then the application 270 can allow the rendered video to show in the areas with the color key (the region corresponding to the right half of the video element 208), while leaving other areas empty or transparent (the region corresponding to the left half of the video element 208).

Thus, in various embodiments, on the client 210 side, the GUI 223 can run in the same way as it would in traditional contexts, except that there is an element that is a colored shape representing the location where a video should be. A video rendering application 270 can play the video and line up its images with the colored shape. The video renderer 270 can draw on top of the color. So, if the location of the video element 208 or its size in the virtual desktop 202 is changed, or a part of the video element 208 becomes blocked by another object, the shape of the color key can be changed accordingly and the video can continue to be drawn over the new colored regions. If, for example, the video goes full screen on the virtual desktop 202, the color key can be repositioned to cover the entire GUI 203 on the virtual desktop 202, and the video rendering application 270 can correspondingly reposition the window 272, over the entire color key and, hence, over the entire GUI 223.

In various embodiments, if a second video element is detected in the webpage 206, then a second color key, different than the first color key, can be generated for drawing the dummy object over the second video element. The system can then intercept encoded video data for the second video element and redirect it to the client to be rendered and displayed over regions with the second color key. This way, by using different color keys for different video elements, the system can avoid potential confusion between the two video elements.

To allow a user to interact with the video, video commands (such as pause, play, fast forward, rewind, change volume, mute volume, seek, etc.) can be detected at the virtual desktop 202 and transmitted to the video rendering application 270 on the client device 210 to be applied. Namely, because user inputs in the client application 220, such as mouse and keyboard inputs, are transmitted to and applied in the virtual desktop 202 by the remoting protocol, when a user makes a video command such as pressing the pause/play button or seeking a video, the command can be detected at the virtual machine 202. The video, however, is playing on the client device 210, in the video rendering application 270. Hence, to put the video command into effect, the virtual desktop 202 can transfer the detected video command to the video rendering application 270 on the client 220, which can effectuate the command. As a result, the user can experience the same level of control over the video as in a traditional setting where the video is played in the virtual desktop 202.

For example, the user may be able to produce video command inputs via a command bar or play bar (e.g., such a bar may be placed at the bottom of the video, it may appear when the mouse is hovered over the video, etc.) The play bar may actually be located in the virtual desktop 202 and inputs into the bar, such as a click on the pause button, would also be detected in the virtual desktop 202. When such inputs are detected in the virtual desktop 202, the commands can be transferred to the video rendering application 270. For example, when a click on the pause button is detected in the virtual desktop 202, a pause command can be sent to the video rendering application 270 to pause the video. Other video commands, such as play, fast forward, seek, change volume, etc. can likewise be detected at the virtual desktop 202 and forwarded to the video rendering application 270 to be put into effect.

Figure 3:
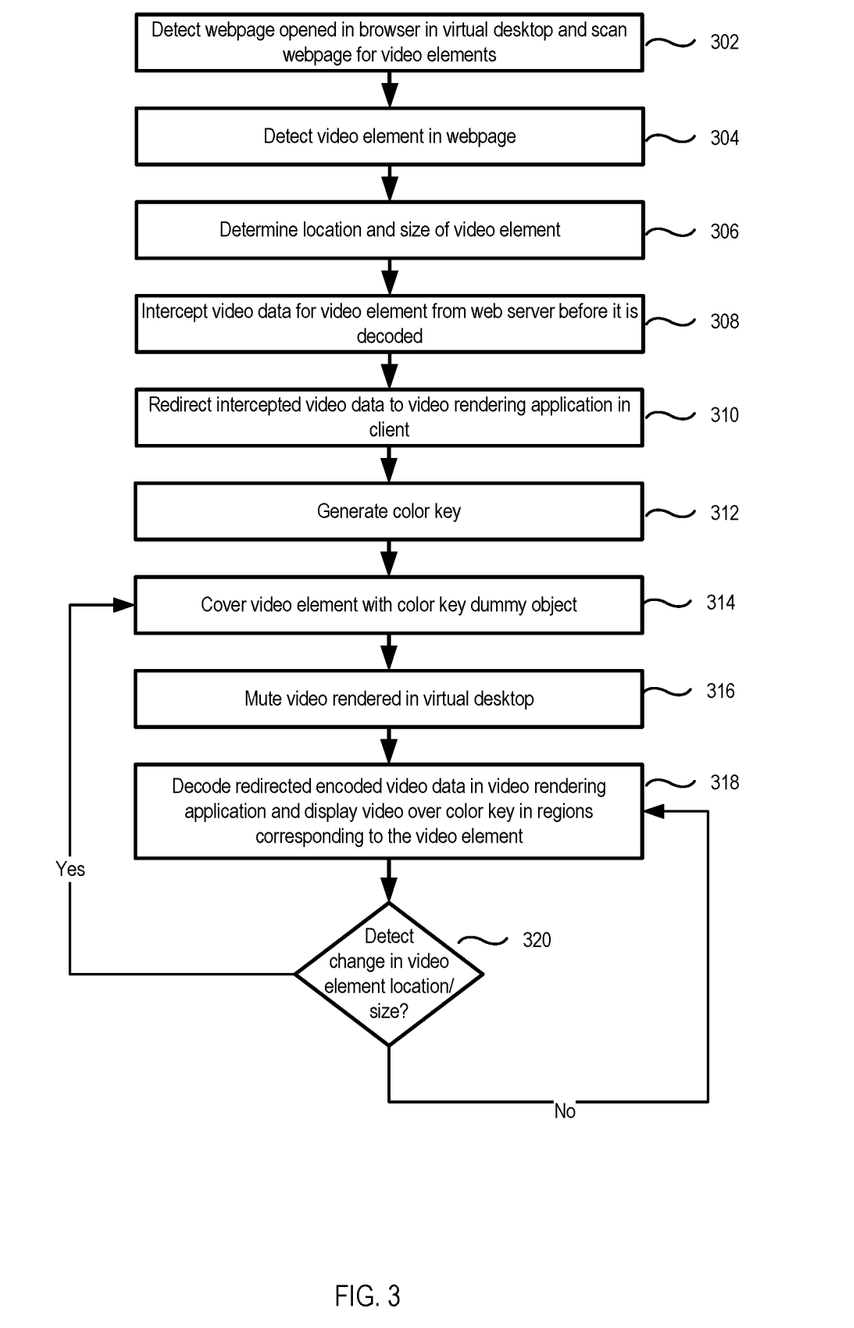
FIG. 3 illustrates an example process flow for video redirection in a virtual desktop environment, in accordance with various embodiments.

FIG. 3 illustrates an example process flow for video redirection in a virtual desktop environment, in accordance with various embodiments. The process can begin in operation 302 by detecting that a webpage is opened in an Internet browser in the virtual desktop and scanning the webpage to locate any video elements. For example, the browser can be configured (e.g., via a browser extension) to perform such scans every time a webpage is opened in the browser by accessing the context of the webpage, as described above. In operation 304, a video element can be detected in the webpage. For example, the browser can detect a video element when searching through the context of the webpage. In operation 306, the location of the video element in the webpage and its size can be determined. For example, the browser can determine these parameters by analyzing the video element in the webpage context. In operation 308, video data transmitted from the web server for being displayed in the video element in the webpage can be intercepted before it is decoded. For example, the browser can request this video data and the data can be intercept when it is transmitted from the web server to the browser, before being decoded in the browser. In operation 310, the intercepted video data can be redirected to a video rendering application in the client. The redirected video can be sent over a protocol virtual channel.

In operation 312, a color key can be generated. For example, the color key can be randomly generated. In operation 314, the video element can be covered with a color key dummy object. For example, the dummy object can be an HTML element that is a solid shape filled with the color key of the same dimensions as the video element, which is placed in the browser window in the location of the video element, thereby blocking the video element. In operation 316, the video being rendered in the virtual desktop can be muted.

In operation 318, the redirected video data can be decoded in the video rendering application in the client and displayed over the color key in regions corresponding to the video element's location. For example, the video rendering application can receive the location and size of the video element and it can render the video in a window with that size and in that location. The video rendering application can also check to see what areas of the video element region are covered with the color key and which areas are not and only display the video in the areas that are covered with the color key. This way, if a portion of the window element (and hence the dummy object) in the virtual desktop is covered by another object, then the video rendering application will not display the video over that object.

In operation 320, the system can check whether a change in the video element's location and size has occurred. If a change has occurred, then the process returns to operation 314, where the changed video element is covered with a dummy object of the generated color key and the process continues. For example, the context of the webpage can be scanned continuously to detect when a change in the video element size or location (e.g., due to a user scrolling or changing video screen size) occurs. If such a change is detected, then the dummy object is redrawn and the process can continue. If a change has not occurred, then the process returns to operation 318, where the redirected video data continues to be decoded and rendered on the client.

Example Implementation

In the following sections, an example implementation of the invention is described for redirecting HTML5 video in a virtual desktop environment. While the provided implementation discusses HTML5 video, the described methods and systems can be used with other video types, as applicable. The solution injects a scripting layer into a web browser to intercept an HTML5 video inside a virtual desktop. The virtual desktop can be, for example, a VMware Horizon virtual desktop, available from VMware, Inc. This layer communicates video commands and encoded video content to a server process inside the virtual desktop. The server process, acting as a proxy between the web browser and a plugin on the client device, transfers this information to the client plugin. The client plugin opens a counterpart video renderer application that interprets the received video commands, decodes the video content, and renders the HTML5 video on the client device. Furthermore, the plugin uses a clipping region for headless video composition on the client, giving the illusion of the video playing inside the virtual desktop.

Design and Implementation

Figure 4:
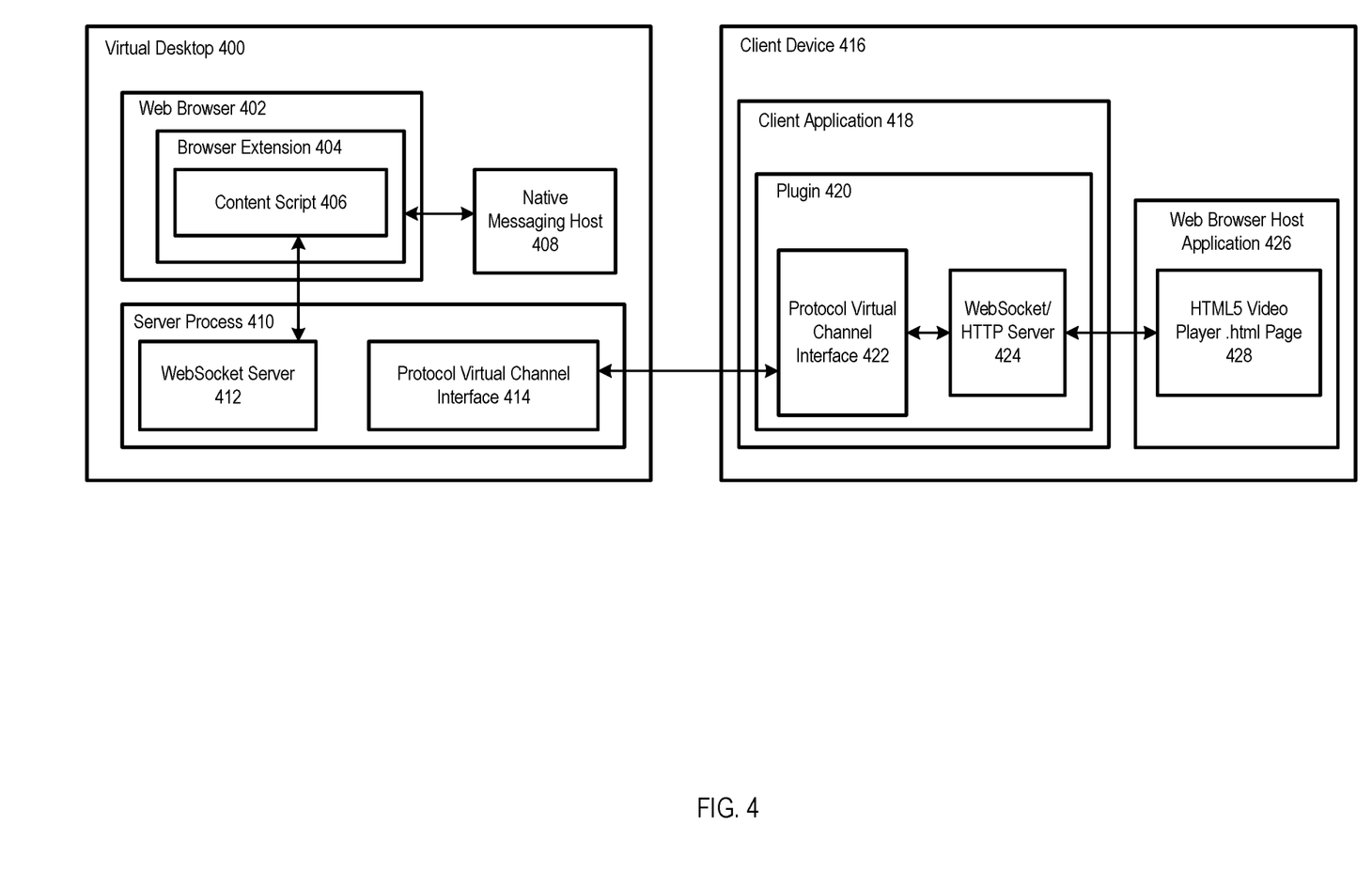
FIG. 4 illustrates an example implementation of a system for redirecting HTML5 video in a virtual desktop environment, in accordance with various embodiments.

FIG. 4 illustrates an example implementation of a system for redirecting HTML5 video in a virtual desktop environment, in accordance with various embodiments. A Client Application 418 (which can be a VMware Horizon Client, available from VMware, Inc.) installed on the client device 416 allows connecting to a virtual desktop 400 (which can be a VMware Horizon Virtual Desktop, available from VMware, Inc.). The HTML5 video redirection solution comprises server-side components that reside in the virtual desktop 400 and client-side components installed in the user's client device 416. The server-side components include a scripting layer injected into the web browser 402 using a browser extension 404, a native messaging host 408 process and a server process 410 that run independently inside the virtual desktop OS. The client-side components include a plugin 420 loaded by the client application 418, a Web Browser Host Application 426 using Chromium Embedded Framework (CEF), and a HTML5 Video Player to render the video using web technologies.

In the virtual desktop 400, the scripting layer in the web browser 402 intercepts and transfers the video information to the local server process 410. The server process 410 processes the video information, and passes it to the plugin 420 on the client device using the protocol virtual channel interface 414. The client plugin 420 starts a Web Browser Host 426 that loads the HTML5 Video Player page 428 and transfers messages received from the server process 410 to the HTML5 Video Player that interprets these messages and provides video playback.

Web Browser Scripting Layer

The solution injects a scripting layer, which is a browser extension 404 that comprises HTML, JavaScript and CSS code. A webpage embeds a HTML5 video using a <video> element. The content script 406 of the browser extension 404 runs in the context of webpages, intercepting and redirecting these HTML5 <video> elements contained in the webpages. The solution instructs the browser 402 to inject the content script 406 into webpages before the browser constructs any other DOM (HTML Document Object Model) or runs any other script.

In addition, the solution adds a native messaging host 408 process component, to facilitate the scripting layer to retrieve the websocket 412 port number of the server process 410. The native messaging API provided by the web browser 402 enables communication between the scripting layer and the native messaging host 408 process using standard input (stdin) and standard output (stdout). A message in either direction is JSON-serialized, UTF8-encoded, and is preceded with a 32-bit message length. The native messaging host 408 process listens to websocket 412 port number requests from the scripting layer on standard input. On a websocket 412 port number request from the scripting layer, the native messaging host 408 process prepares a JSON-serialized and UTF8-encoded response with the websocket 412 port number value of the server process 410. It sends the 32-bit message length of the response followed by the actual response via the standard output.

When the user opens a webpage in a browser 402 with the installed browser extension 404, the injected content script 406 inside the webpage performs the following tasks:

1. It enables interception of Media Source Extensions (MSE) by overwriting the createObjectURL( ) and revokeObjectURL( ) static methods of the URL namespace, and the addSourceBuffer( ) method of the MediaSource interface. MSE allows JavaScript to generate media streams for a <video> element, and modern video streaming web sites on the Web use it to provide video playback. This implementation of the createObjectURL( ) method saves the link between the URL generated by invoking the original createObjectURL( ) method and the MediaSource object passed as an argument to it. This implementation of addSourceBuffer( ) method, returns a counterpart SourceBufferThunkImpl object, defined by the content script 406, based on the MSE's SourceBuffer interface, and associates this object with a <video> element using the URL-MediaSource mapping saved by the createObjectURL( ) method.

2. It finds <video> elements in the webpage after the webpage is completely loaded by the web browser 402, and initializes a VideoContext object, defined by the content script 406, for each <video> element found. The VideoContext constructor adds event listeners such as loadstart, play, pause and seeked for the <video> element and sends a Control message to the server process 410 whenever the browser 402 fires these events. The initial value of the state property of the VideoContext object is Uninitialized.

3. It retrieves the websocket 412 port number of the server process 410 from the native messaging host 408 process, using the native messaging API. Upon receiving a loadstart event for the <video> element, it opens a websocket 412 connection to the server process 410 and subscribes to the incoming websocket 412 messages. Then, it sends a CreateInstance message comprised of the document's URL, the initial width and height of the <video> element, the left and the top offset values of the element relative to the document, the version of the browser extension 404 and the information about the webpage's environment. Consequently, it sets the state property of the VideoContext object to Pending.

4. It starts the redirection of <video> element and sets the state property of the VideoContext object to Redirection, on receiving the CreateInstanceDone message from the server process with the accept property set to true. Consequently, it cloaks the <video> element with a <div> element, named as Overlay Element, setting the background color of the <div> element to the color key specified in the message. Then, it sends the StartURL message to the server process 410 containing the source information of the <video>. In the event that the accept property of the CreateInstanceDone message is false, the HTML5 video is not supposed to be redirected and should be rendered on the virtual desktop itself, therefore it closes the websocket 412 connection and sets the state of the VideoContext object back to Uninitialized.

5. It sets the volume and muted properties of the <video> element such that there is no audio on the remote desktop 400, since the audio of the <video> element will play in the HTML5 Video Player page loaded by the Web Browser Host Application on the client device. Then, it hijacks volume and mute properties by overwriting the get( ) and set( ) methods of the property, and sends a Control message to the server process 410 on invocation of the set( ) method of these properties.

6. Tracks the position of the <video> element and its dimensions, and adjusts the Overlay Element's position and dimensions accordingly. It also sends an UpdateOverlay message to the server process 410 including the new dimensions and position of the <video> on a change.

7. Whenever the <video> reloads, it sends a StopURL message for the old source and a StartURL for the new source to the server process 410. Also, it sends the StopURL message on invocation of the revokeObjectURL( ) static method.

8. It overwrites addSourceBuffer( ) method of the MediaSource object, and makes it return a SourceBufferThunkImpl object, defined by the content script, in place of the traditional SourceBuffer object. In addition, it sends an AddSourceBuffer message with the SourceBufferID of the SourceBufferThunkImpl object to the server process 410.

9. The SourceBufferThunkImpl object intercepts appendBuffer( ) and abort( ) of the SourceBuffer interface. It sends an AppendBuffer message to the server process 410 inside the appendBuffer( ) method and the AbortBuffer message inside the abort( ) method. The AppendBuffer message includes the media segment passed as a parameter to the appendBuffer( ) method and the SourceBufferID of the SourceBufferThunkImpl object. The scripting layer 406 also invokes the raw appendBuffer( ) and abort( ) methods of the SourceBuffer interface to allow the upper layer, interfacing with the SourceBufferThunkImpl objects, to continue generating the media streams.

Virtual Desktop Server Process

The solution adds a server process 410 that resides in the remote desktop 400, to facilitate HTML5 video redirection. The server process 410 hosts a websocket server 412 to communicate with the web browser's scripting layer. It processes the video information sent to it by the scripting layer and uses protocol virtual channels to transfer the video content and messages to the plugin 420 on the client device 416, thereby acting as a proxy between the web browser of the virtual desktop 400 and the plugin 420 on the client device 416. Moreover, it tracks the browser tab window that is the container to the HTML5 video being redirected.

The server process 410 maintains a white list of URL match patterns to determine if video redirection is allowed on a particular document URL. The white list can be determined by administrators in order to identify on which URLs (which websites) video redirection should take place, and on which websites videos should continue to be rendered in the virtual desktop 400 without redirection. Upon receiving the CreateInstance message from the scripting layer, the server process 410 parses the message to retrieve the document URL. Then, it compares the document URL against the white list of URL match patterns. When matched, it approves this message by replying with a CreateInstanceDone message with the accept property set to true. In addition, it generates a color key and adds to this reply. The scripting layer creates a HTML <div> element with this color key as the background color, which overlays on the video area.

The server process 410 also needs to detect the video playback area and the corresponding clipping region. It first finds the native window handle of the browser's tab window. The scripting layer 410 sends the Overlay Element's size and position to the server process through UpdateOverlay message. By combining both, the video playback's absolute position and size can be calculated. Next, the server process 410 takes a monochrome screenshot of the video area. The value "1" stands for the overlay color, a.k.a background color, and the value "0" stands for the foreground color. The screenshot uses 1-bit for each pixel to achieve memory efficiency. The clipping region is obtained by combining all the foreground values into the windows HRGN handle. In the end, the server process 410 sends the video playback's position, size, visibility, enable flag and raw data of the HRGN to the client plugin 420.

Client Plugin

The solution adds a client plugin 420 component, which is loaded by the Client 418 on the user's client device 416. The client plugin 420 communicates with the server process 410 through the protocol virtual channels 414. It creates a websocket server 412 after the protocol virtual channel 414 connection is established.

The client plugin 420 starts a Web Browser Host Application 426 executable on receiving the CreateInstance message from the server process. It creates a container window and associates it with a randomized SHA-256 hash token. Then, it passes the container HWND along with the token, the initial dimensions of the HTML5 Video Player page 428, and the port number of the hosted websocket server 412 to the Web Browser Host Application 426 through the command line.

Next, the Web Browser Host Application 426 embeds a HTML5 Video Player page 428 control as a child window of the container window and hands over the token and port number of the websocket server 412 to the HTML5 Video Player control. The HTML5 Video Player connects to the websocket server 412 at the given port number and hands back the token. The websocket server 412 validates the token and allows the connection if validation is passed. The same token is used to map the HTML5 Video Player page 428 with the video playback instance on the server. The websocket server 412 sends the video content and messages received from the server process 410 to the HTML5 Video Player page 428. The HTML5 Video Player page 428 processes the video information and renders the HTML5 video.

Lastly, the client plugin 420 listens to the UpdateOverlay message from the server process 410. It sets the Web Browser Host Window's absolute position, size, visibility, enable style and the clipping region the same as the video playback in the server. It composites the Web Browser Host Window onto the desktop viewer window of the Client 418 in a headless manner, making it appear that the video is playing in the virtual desktop 400.

Web Browser Host Application

Chromium Embedded Framework (or CEF) allows embedding a Chromium-based web browser control in a native application. The Web Browser Host Application 426, started by the client plugin 420 on a redirection request, embeds a HTML5-compliant browser engine using the CEF library and makes the embedded web browser control a child of the Client's 418 desktop viewer window. It then navigates the web browser control to the HTML5 video player page 428 that provides playback of the redirected HTML5 video on the client device 416.

HTML5 Video Player

The solution adds a HTML5 Video Player 428 component, which is a page in HTML format (HTML5 VideoPlayer.html) that resides in the plugins directory of the client 416, and loaded by Web Browser Host Application 426 on the client device 416. The HTML5 Video Player page 428 embeds a full-page <video> element to provide playback of the redirected video content of the virtual desktop 400. It contains HTML5, JavaScript and CSS code that communicates with the client plugin 420 using a websocket 412, processes the redirected video commands and un-decoded video content sent to it by the client plugin 420, and renders the HTML5 video based on this video information. The HTML5 Video Player performs the following tasks to provide video playback on the client device:

1. It parses command line parameters and then starts a client websocket 412 connection to the specified port number of the web socket server 412 in localhost hosted by the client plugin 420. After the websocket 412 opens successfully, it sends the token to the client plugin 420.

2. It sets the <video> element's src parameter to the URL specified in a StartURL message. Media Source Extensions (MSE) creates URLs that start with a blob prefix, for which the HTML5 Video Player instantiates a MediaSource object and sets the src parameter of the <video> element to the return value of the createObjectURL( ) method of the URL namespace.

3. It unloads the <video> element on receiving a StopURL message from the client plugin 420. In addition, it removes all source buffers and invokes the revokeObjectURL( ) method of the URL namespace of whenever MSE is used.

4. It handles an AddSourceBuffer message from the client plugin 420 by creating a SourceBuffer object for the page's <video> element, which is of the same mime-type as specified in the message. This is achieved using the addSourceBuffer( ) method on the instantiated MediaSource object. In addition, it saves the mapping between the SourceBufferID present in this message and the newly created SourceBuffer object.

5. It processes a Control message by performing an action based on the command specified in the message. In case of play and pause commands, it invokes the HTML5 <video> element's play( ) and pause( ) methods respectively. In case of the seeked command, it sets the currentTime property to the time value specified in the message. In case of volumechange and muted commands, it sets the volume and muted properties of <video> respectively.

6. It processes an AppendBuffer message by extracting the SourceBufferID from the media segment included in the message and appends the media segment to the appropriate SourceBuffer object of the page, using appendBuffer( ) method of SourceBuffer interface.

Figure 5:
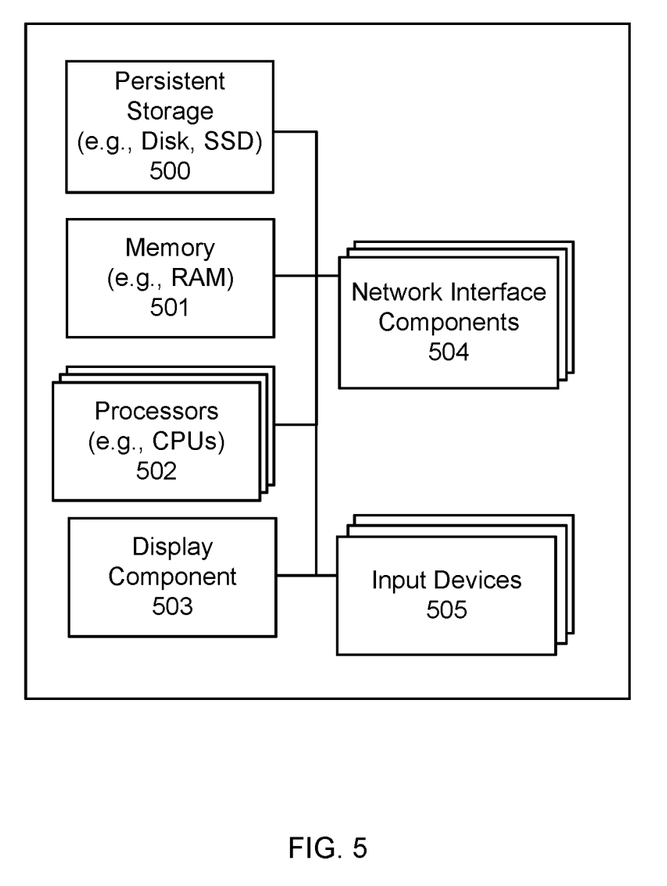
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in a storage medium component. The storage medium can include many types of memory, persistent data storage, or non-transitory computer-readable storage media. For example, the storage medium may take the form of random access memory (RAM) 501 storing program instructions for execution by the processor(s) 502, a persistent storage (e.g., disk or SSD) 500, a removable memory for sharing information with other devices and/or the like. The computing device typically can further comprise a display component 503, such as a monitor, a touch screen, liquid crystal display (LCD), or the like. In various embodiments, the computing device will include at least one input device 505 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 504 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for redirecting video in a virtual desktop environment, the method comprising:
   remoting a virtual desktop executing on a remote server to a client device, the virtual desktop executing a web browser accessing a webpage with an embedded video;
   intercepting video data for the embedded video transmitted to the virtual desktop inside the web browser by a web browser extension before the video is decoded on the virtual desktop; and
   transmitting the encoded video intercepted by the web browser extension to the client device;
   wherein the encoded video is decoded and rendered on the client device.

2. The method of claim 1, further comprising:
   identifying a video element corresponding to the embedded video in the webpage on the virtual desktop; and
   blocking the video element in the virtual desktop graphical user interface by placing a dummy object over the video element.

3. The method of claim 2, wherein:
   the dummy object is a solid element colored in a color key; and
   the encoded video is rendered on the client device and the video is drawn only over areas of the GUI where the color key is present.

4. The method of claim 1, further comprising:
   detecting a video command for the video in the virtual desktop; and
   communicating the video command from the virtual desktop to the client device.

5. The method of claim 1, wherein the video is an HTML5 (Hypertext Markup Language 5) video.

6. The method of claim 1, wherein the video is conveyed to the client device over a protocol virtual channel.

7. A computing device, comprising: at least one processor; and
   memory including instructions that, when executed by the at least one processor, cause the computing device to perform the steps of:
   remoting a virtual desktop executing on a remote server to a client device, the virtual desktop executing a web browser accessing a webpage with an embedded video;
   intercepting video data for the embedded video transmitted to the virtual desktop inside the web browser by a web browser extension before the video is decoded on the virtual desktop; and
   transmitting the encoded video intercepted by the web browser extension to the client device; and
   wherein the encoded video is decoded and rendered on the client device.

8. The computing device of claim 7, wherein the memory further includes instructions that when executed by the at least one processor, cause the computing device to perform the steps of:
   identifying a video element corresponding to the embedded video in the webpage on the virtual desktop; and
   blocking the video element in the virtual desktop graphical user interface by placing a dummy object over the video element.

9. The computing device of claim 8, wherein:
   the dummy object is a solid element colored in a color key; and
   the encoded video is rendered on the client device and the video is drawn only over areas of the GUI where the color key is present.

10. The computing device of claim 8, wherein the memory further includes instructions that when executed by the at least one processor, cause the computing device to perform the steps of:
    detecting a video command for the video in the virtual desktop; and
    communicating the video command from the virtual desktop to the client device.

11. The computing device of claim 8, wherein the video is an HTML5 (Hypertext Markup Language 5) video.

12. The computing device of claim 8, wherein the video is conveyed to the client device over a protocol virtual channel.

13. A non-transitory computer readable storage medium comprising one or more sequences of instructions, the instructions when executed by one or more processors causing the one or more processors to execute the operations of:
    remoting a virtual desktop executing on a remote server to a client device, the virtual desktop executing a web browser accessing a webpage with an embedded video;
    intercepting video data for the embedded video transmitted to the virtual desktop inside the web browser by a web browser extension before the video is decoded on the virtual desktop; and
    transmitting the encoded video intercepted by the web browser extension to the client device;
    wherein the encoded video is decoded and rendered on the client device.

14. The non-transitory computer readable storage medium of claim 13, further comprising instructions that when executed by the one or more processors cause the one or more processors to execute the operations of:

identifying a video element corresponding to the embedded video in the webpage on the virtual desktop; and blocking the video element in the virtual desktop graphical user interface by placing a dummy object over the video element.

15. The non-transitory computer readable storage medium of claim 14, wherein:

the dummy object is a solid element colored in a color key; and the encoded video is rendered on the client device and the video is drawn only over areas of the GUI where the color key is present.

16. The non-transitory computer readable storage medium of claim 13, further comprising instructions that when executed by the one or more processors cause the one or more processors to execute the operations of:

detecting a video command for the video in the virtual desktop; and communicating the video command from the virtual desktop to the client device.

17. The non-transitory computer readable storage medium of claim 13, wherein the video is an HTML5 (Hypertext Markup Language 5) video.

\* \* \* \* \*